United States Patent
Kim et al.

(10) Patent No.: US 9,490,483 B2
(45) Date of Patent: Nov. 8, 2016

(54) POSITIVE ACTIVE MATERIAL FOR RECHARGEABLE LITHIUM BATTERY, METHOD OF PREPARING SAME, AND RECHARGEABLE LITHIUM BATTERY INCLUDING SAME

(71) Applicant: Samsung SDI Co., Ltd., Yongin, Gyeonggi-Do (KR)

(72) Inventors: Ji-Hyun Kim, Yongin (KR); Yong-Chan You, Yongin (KR); Han-Eol Park, Yongin (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 237 days.

(21) Appl. No.: 13/865,832

(22) Filed: Apr. 18, 2013

(65) Prior Publication Data

US 2014/0038039 A1    Feb. 6, 2014

(30) Foreign Application Priority Data

Aug. 3, 2012  (KR) .................. 10-2012-0085310

(51) Int. Cl.
| | |
|---|---|
| H01M 4/00 | (2006.01) |
| H01M 4/13 | (2010.01) |
| H01M 4/58 | (2010.01) |
| C01B 25/45 | (2006.01) |
| H01M 10/052 | (2010.01) |

(52) U.S. Cl.
CPC ............ *H01M 4/5825* (2013.01); *C01B 25/45* (2013.01); *H01M 10/052* (2013.01); *Y02E 60/122* (2013.01)

(58) Field of Classification Search
CPC ........ H01M 4/362; H01M 4/48; H01M 4/52; H01M 4/525; H01M 4/5825; H01M 4/8882
USPC .......................................... 429/221, 231.95
See application file for complete search history.

(56) References Cited

U.S. PATENT DOCUMENTS

| | | | |
|---|---|---|---|
| 5,910,382 A * | 6/1999 | Goodenough et al. .... | 429/218.1 |
| 6,632,566 B1 | 10/2003 | Yamada et al. | |
| 7,147,969 B2 * | 12/2006 | Yamada ................ | C01B 25/45 |
| | | | 252/182.1 |
| 8,273,481 B2 | 9/2012 | Gauthier et al. | |
| 2002/0114754 A1 | 8/2002 | Hosoya et al. | |
| 2009/0081549 A1 | 3/2009 | Liaw et al. | |
| 2010/0237276 A1 | 9/2010 | Chiu | |
| 2012/0107686 A1 | 5/2012 | Ryu et al. | |

FOREIGN PATENT DOCUMENTS

| | | |
|---|---|---|
| CN | 1549366 A | 11/2004 |
| CN | 101740752 A | 6/2010 |
| CN | 102169991 A | 8/2011 |
| EP | 2 448 045 A1 | 5/2012 |
| JP | 2002-110161 A | 4/2002 |
| JP | 2006-131485 A | 5/2006 |
| KR | 10-0672879 B1 | 1/2007 |
| KR | 10-2007-0019972 A | 2/2007 |
| KR | 10-2008-0006928 A | 1/2008 |

OTHER PUBLICATIONS

European Extended Search Report dated Nov. 26, 2013 for European Patent Application No. EP 13 172 284.5 which shares priority of Korean Patent Application No. KR 10-2012-0085310 with captioned U.S. Appl. No. 13/865,832, and cites the above-identified references.

Chinese Office Action dated Jun. 21, 2016 for Chinese Patent Application No. CN 201310224461.2 which shares priority of Korean Patent Application No. KR 10-2012-0085310 with subject U.S. Appl. No. 13/865,832, and cites the above-identified references numbered 1-3.

Korean Office Action dated Sep. 23, 2016 for Korean Patent Application No. KR 10-2012-0085310 which cites the above-identified reference numbered 1, and from which subject U.S. Appl. No. 13/865,832 claims priority.

* cited by examiner

*Primary Examiner* — Patrick Ryan
*Assistant Examiner* — Julian Anthony
(74) *Attorney, Agent, or Firm* — Knobbe Martens Olson & Bear LLP

(57) ABSTRACT

In an aspect, a positive active material for a rechargeable lithium battery that includes a lithium composite oxide including a Fe-containing compound phase and a Li-containing compound phase, a method of preparing the same, and a rechargeable lithium battery including the same are provided.

10 Claims, 6 Drawing Sheets

POSITIVE ACTIVE MATERIAL FOR RECHARGEABLE LITHIUM BATTERY, METHOD OF PREPARING SAME, AND RECHARGEABLE LITHIUM BATTERY INCLUDING SAME

CROSS-REFERENCE TO RELATED APPLICATIONS

This application claims priority to and the benefit of Korean Patent Application No. 10-2012-0085310 filed on Aug. 3, 2012 in the Korean Intellectual Property Office, the disclosure of which is incorporated in its entirety herein by reference.

BACKGROUND

1. Field

This disclosure relates to a positive active material for a rechargeable lithium battery, a method of preparing the same, and a rechargeable lithium battery including the same.

2. Description of the Related Technology

Recently, due to reductions in size and weight of a portable electronic equipment, there has been a need to develop rechargeable lithium batteries for the portable electronic equipment having both high performance and large capacity.

The rechargeable lithium battery may be manufactured by injecting an electrolyte into a battery cell, which includes a positive electrode including a positive active material capable of intercalating/deintercalating lithium ions and a negative electrode including a negative active material capable of intercalating/deintercalating lithium ions.

As for the positive active material, $LiCoO_2$ has been widely used but has a problem of a high manufacturing cost and an unstable supply due to scarcity of cobalt (Co), toxicity to a human body, and an environmental contamination.

Accordingly, in order to develop an economic and stable positive active material having high-capacity, a lithium iron phosphate compound having an olivine structure has been investigated.

However, the lithium iron phosphate having an olivine structure has low conductivity and a slow diffusion rate of lithium ions and deteriorated capacity at a high charge and discharge rate and thus, is limitedly used in a field requiring high current density.

SUMMARY

Some embodiments provide a positive active material having excellent conductivity and thus, high-capacity and excellent high-rate charge and discharge characteristics.

Some embodiments provide a method of preparing the positive active material.

Some embodiments provide a positive electrode for a rechargeable lithium battery including the positive active material; and a current collector.

Some embodiments provide a rechargeable lithium battery including the positive active material.

Some embodiments provide a positive active material for a rechargeable lithium battery that includes a lithium composite oxide represented by Chemical Formula 1,

   Chemical Formula 1

In Chemical Formula 1, 0.8≤x≤1.2, and 0.9≤y≤1.1 provided both x and y are not 1. In some embodiments, the lithium composite oxide includes a Fe-containing compound phase and a Li-containing compound phase and a mole ratio of the Fe-containing compound phase relative to the Li-containing compound phase (based on moles of Fe and Li) ranges from about 0.80 to about 1.00.

In some embodiments, the mole ratio of the Fe-containing compound phase relative to the Li-containing compound phase may range from about 0.90 to about 1.00.

In some embodiments, the mole ratio of the Fe-containing compound phase relative to the Li-containing compound phase may range from about 0.90 to about 0.99.

In some embodiments, the Fe-containing compound phase may include a $Fe^{2+}$-containing compound phase, a $Fe^{3+}$-containing compound phase, or a combination thereof.

In some embodiments, the $Fe^{2+}$-containing compound phase may be included in an amount of about 58 mol % to about 100 mol % and specifically, about 58 mol % to about 90 mol % based on the total amount of the Fe-containing compound phase.

In some embodiments, the Fe-containing compound phase may be included in an amount of about 30 wt % to about 40 wt % based on the total amount of the lithium composite oxide.

Some embodiments provide a method of preparing a positive active material for a rechargeable lithium battery that includes mixing a Fe-containing compound, a lithium salt, and a phosphate salt in a ratio (based on moles of Fe, lithium, and phosphorus) of about 0.8 to 1.2:about 0.9 to 1.1:about 0.8 to 1.2 to obtain a mixture; and heat-treating the mixture at a temperature of about 650° C. to about 850° C. under a reduction atmosphere provided that the ratio of Fe, lithium, and phosphorus is not 1:1:1 or 1:1.05:1.

In some embodiments, the Fe-containing compound may include $FeSO_4$, $FeCO_3$, $FeO$, $FeC_2O_4$, $FePO_4$, $Fe_3(PO_4)_2$, or a combination thereof.

In some embodiments, the lithium salt may include at least one component selected from the group consisting of $Li_2CO_3$, $Li_3PO_4$, and LiCl.

In some embodiments, the phosphate salt may include at least one component selected from the group consisting of $Li_3PO_4$, $(NH_4)_2HPO_4$, $NH_4H_2PO_4$, and $H_3PO_4$.

In some embodiments, the Fe-containing compound, the lithium salt and the phosphate salt may be mixed in a mole ratio (based on moles of Fe, lithium, and phosphorus) of about 0.8 to 1.05:about 1.0 to 1.1:about 0.9 to 1.1 provided that the ratio of Fe, lithium, and phosphorus is not 1:1:1 or 1:1.05:1.

In some embodiments, the reduction atmosphere may include a $N_2$ atmosphere, a $H_2$ atmosphere, or a combination thereof.

In some embodiments, the heat-treatment may be performed at about 650° C. to about 800° C.

Some embodiments provide a positive electrode for a rechargeable lithium battery including the positive active material is provided.

Some embodiments provide a rechargeable lithium battery including a positive electrode including the positive active material; a negative electrode; and an electrolyte is provided.

Hereinafter, certain embodiments of this disclosure will be described in detail.

The positive active material has excellent conductivity and thus, a rechargeable lithium battery including the positive active material may have high-capacity and excellent high-rate charge and discharge characteristics.

DETAILED DESCRIPTION

Figure 1:
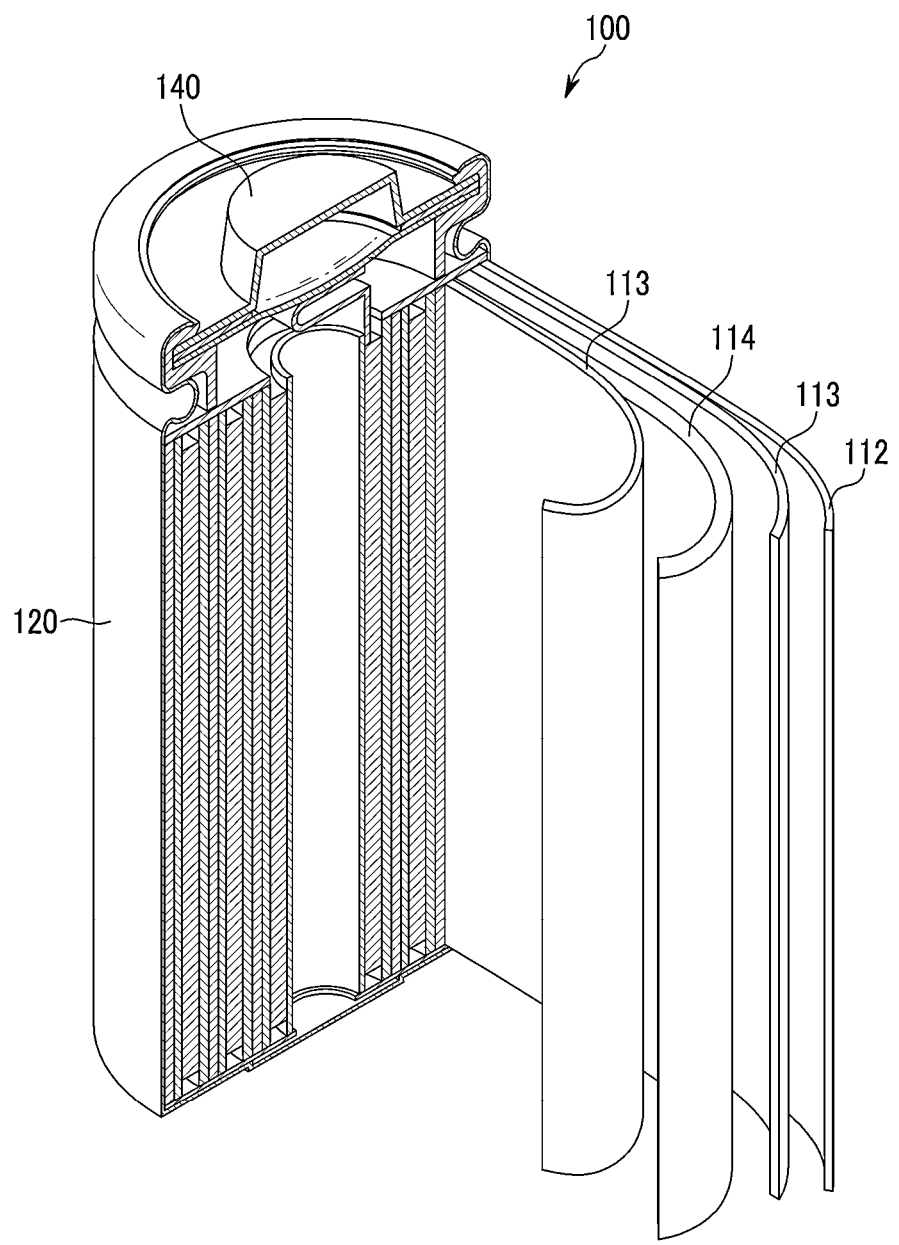
FIG. 1 is a schematic view showing the lithium rechargeable battery according to an aspect of the present embodiments.
Figure 2:
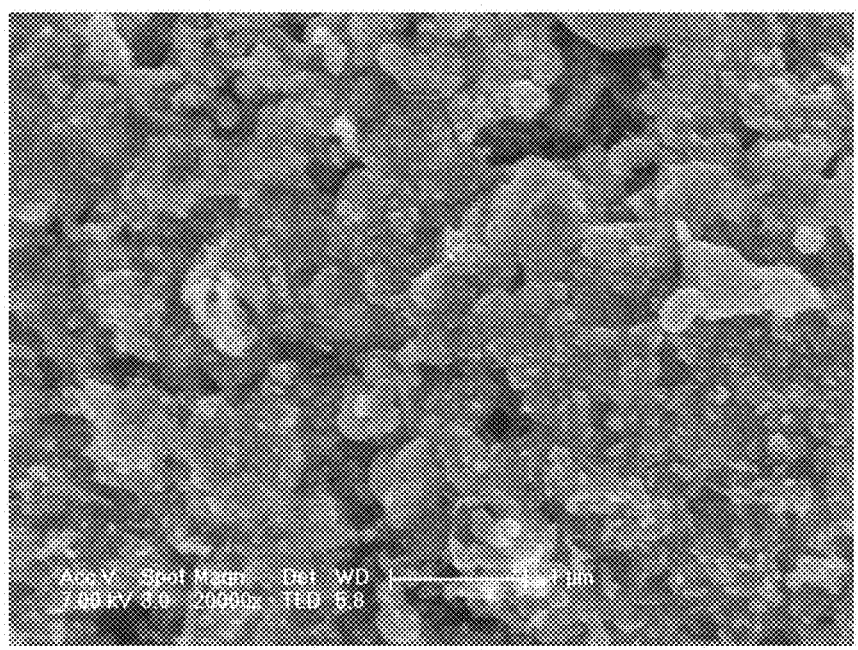
FIGS. 2 to 5 are respectively SEM photographs sequentially showing positive active materials according to Examples 1 to 4.
Figure 3:
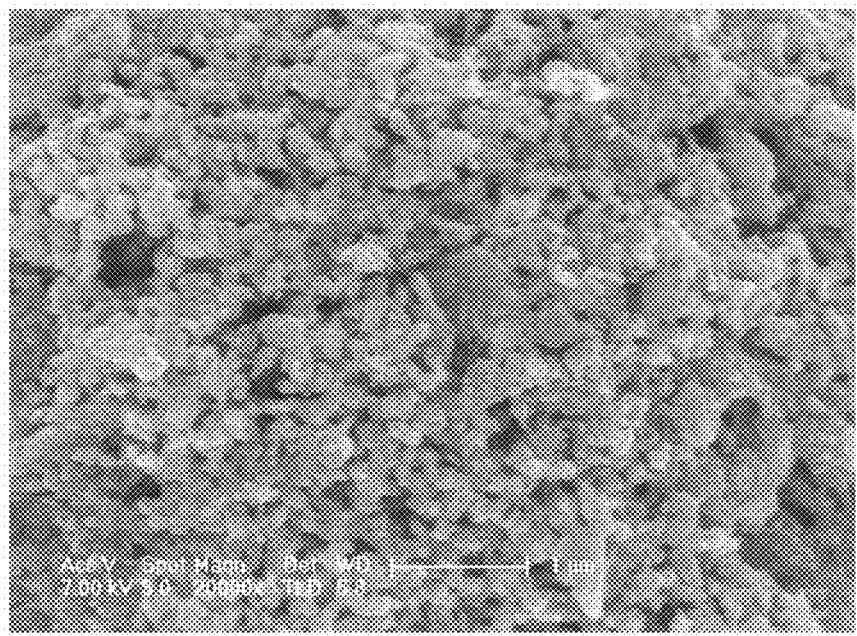
Figure 4:
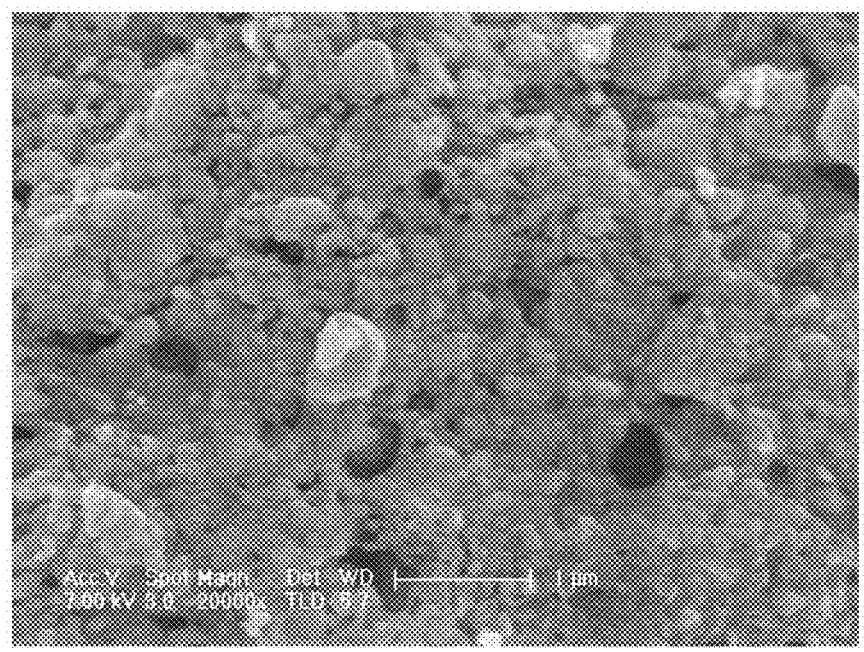
Figure 5:
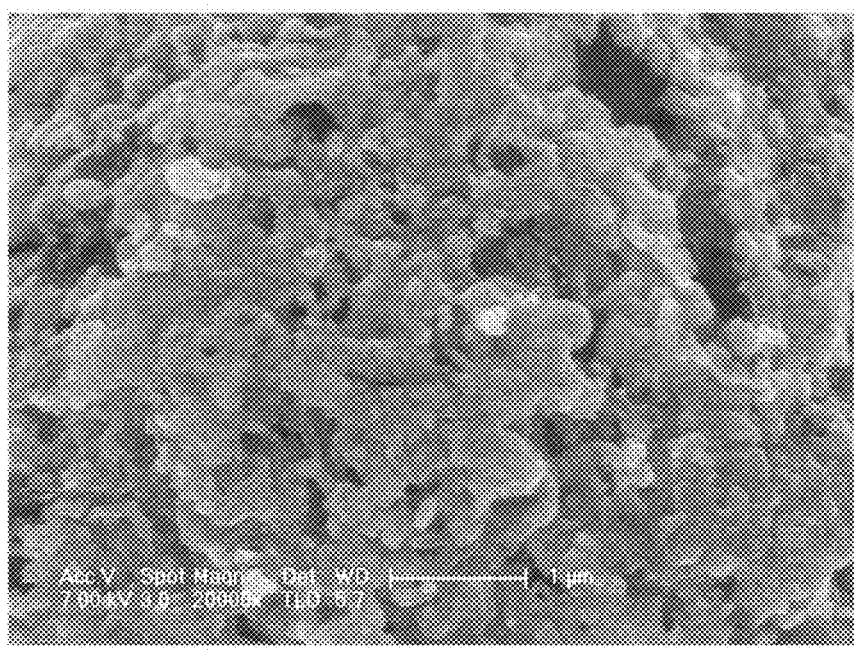

Exemplary embodiments of the present disclosure will hereinafter be described in detail. However, these embodiments are only exemplary, and this disclosure is not limited thereto.

Some embodiments provide a positive active material including a lithium composite oxide comprising Li (lithium), Fe (iron), P (phosphorus) and O (oxygen) in a ratio represented by the following Chemical Formula 1.

$$Li_xFe_yPO_4 \qquad \text{Chemical Formula 1}$$

In Chemical Formula 1, 0.8≤x≤1.2, and 0.9≤y≤1.1 provided both x and y are not 1.

In some embodiments, the lithium composite oxide represented by the above Chemical Formula 1 may include a Fe-containing compound phase and a Li-containing compound phase.

In some embodiments, the lithium iron phosphate oxide has high capacity and excellent stability and may realize a rechargeable lithium battery having good cycle-life characteristic but has low conductivity and a slow diffusion rate of lithium ions and thus, deteriorated capacity and is limited used in a field requiring high current density.

Some embodiments provide a lithium iron phosphate oxide prepared by adjusting its internal phases, specifically, a mole ratio between Li-containing compound phase and Fe-containing compound phase, a mole ratio between $Fe^{2+}$-containing compound phase and $Fe^{3+}$-containing compound phase, and the like as a positive active material. In some embodiments, the lithium iron phosphate oxide has improved conductivity and thus, may realize a rechargeable lithium battery having high initial charge and discharge capacity and excellent high-rate charge and discharge characteristics when used as a positive active material.

Specifically, a mole ratio of the Fe-containing compound phase relative to the Li-containing compound phase may range from about 0.80 to about 1.00, and more specifically about 0.90 to about 1.00. In some embodiments, the lithium composite oxide has improved conductivity and thus, may realize a rechargeable lithium battery having high initial charge and discharge capacity and excellent high-rate charge and discharge characteristics when the Fe-containing compound phase relative to the Li-containing compound phase are used in a mole ratio of the preceding range.

In some embodiments, the Fe-containing compound phase may include a $Fe^{2+}$-containing compound phase, a $Fe^{3+}$-containing compound phase, or a combination thereof. In some embodiments, the $Fe^{2+}$-containing compound phase may be included in amount of about 58 mol % to about 100 mol % and specifically, about 58 mol % to about 90 mol % based on the total amount of the Fe-containing compound phase. In some embodiments, a lithium composite oxide is applied with conductivity and thus, may realize a rechargeable lithium battery having high-capacity and excellent high-rate charge and discharge characteristics when the $Fe^{2+}$-containing compound phase is included in an amount of the preceding range.

In some embodiments, the Fe-containing compound phase may be included in an amount of about 30 wt % to about 40 wt % and specifically, about 31 wt % to about 39 wt % based on the total amount of the lithium composite oxide. In some embodiments, a lithium composite oxide has improved conductivity and thus, may realize a rechargeable lithium battery having high initial charge and discharge capacity and excellent high-rate charge and discharge characteristics when the Fe-containing compound phase is included in an amount of the preceding range.

In some embodiments, the lithium composite oxide may be prepared by mixing a Fe-containing compound, a lithium salt, and a phosphate salt and then, heat-treating the mixture.

Examples of the Fe-containing compound may include $FeSO_4$, $FeCO_3$, $FeO$, $FeC_2O_4$, $FePO_4$, $Fe_3(PO_4)_2$, and the like, which may be used singularly or in a mixture of more than two thereof.

In some embodiments, the lithium salt may include, for example, $Li_2CO_3$, $Li_3PO_4$, LiCl, and the like, which may be used singularly or in a mixture of more than two thereof.

In some embodiments, the phosphate salt may include, for example, $Li_3PO_4$, $(NH_4)_2HPO_4$, $NH_4H_2PO_4$, $H_3PO_4$, and the like, which may be used singularly or in a mixture of more than two thereof.

Some embodiments provide a lithium composite oxide obtained by adjusting a mole ratio among the Fe-containing compound, the lithium salt, and the phosphate salt, the heat-treating condition, and the like and thus, having an internally adjusted phase, specifically, having a mole ratio adjusted between the Li-containing compound phase and the Fe-containing compound phase.

In some embodiments, the mixture may be obtained by mixing the Fe-containing compound, the lithium salt, and the phosphate salt in a mole ratio (based on moles of Fe, lithium, and phosphorus) of about 0.8 to 1.2:about 0.9 to 1.1:about 0.8 to 1.2 provided that the ratio of Fe, lithium, and phosphorus is not 1:1:1 or 1:1.05:1. In some embodiments, the mixture may be obtained by mixing the Fe-containing compound, the lithium salt, and the phosphate salt in a mole ratio (based on moles of Fe, lithium, and phosphorus) of about 0.8 to 1.05:about 1.0 to 1.1:about 0.9 to 1.1. In some embodiments, a lithium composite oxide is applied with conductivity and thus, may realize a rechargeable lithium battery having high initial charge and discharge capacity and excellent high-rate charge and discharge characteristics when the Fe-containing compound, the lithium salt, and the phosphate salt are used in a mole ratio of the preceding range.

In some embodiments, the heat-treatment may be performed under a reduction atmosphere and specifically, under a $N_2$ or $H_2$ atmosphere. In some embodiments, a lithium composite oxide may have improved conductivity and thus, realize a rechargeable lithium battery having high initial charge and discharge capacity and high-rate charge and discharge characteristics when the heat treatment is performed under a $N_2$ or $H_2$ atmosphere.

In some embodiments, the heat-treatment may be performed at about 650° C. to about 850° C. In some embodiments, the heat-treatment may be performed at about 650 to about 800° C. In some embodiments, a lithium composite oxide has improved conductivity and thus, may realize a rechargeable lithium battery having high initial charge and discharge capacity and excellent high-rate charge and discharge characteristics when the heat treatment is performed at a temperature of the preceding temperature range.

Hereinafter, a rechargeable lithium battery including the positive active material is illustrated referring to FIG. 1.

FIG. 1 is a schematic view showing the lithium rechargeable battery according to an aspect of the present embodiments.

Referring to FIG. 1, a rechargeable lithium battery 100 according to an aspect of the present embodiments includes a positive electrode 114, a negative electrode 112 facing the positive electrode 114, a separator 113 interposed between the negative electrode 112 and the positive electrode 114, an electrolyte (not shown) impregnating the separator 113, a battery case 120, and a sealing member 140 sealing the battery case 120.

In some embodiments, the positive electrode 114 may include a current collector and a positive active material layer disposed on the current collector. In some embodiments, the positive active material layer may include a positive active material, a binder, and optionally a conductive material.

In some embodiments, the current collector may be Al (aluminum), but is not limited thereto.

In some embodiments, the positive active material may be the lithium composite oxide as disclosed and described herein. Specifically, when the lithium iron phosphate oxide including a Fe-containing compound phase and a Li-containing compound phase in a mole ratio adjusted between them is used as a positive active material, the lithium iron phosphate oxide may have improved conductivity and thus, realize a rechargeable lithium battery having high initial charge and discharge capacity and excellent high-rate charge and discharge characteristics.

In some embodiments, the binder may improve binding properties of the positive active material particles to each other and to a current collector. Examples of the binder include at least one component selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In some embodiments, the conductive material may be used in order to improve conductivity of an electrode. Any electrically conductive material may be used as a conductive material unless it causes a chemical change. Examples of the conductive material include one or more kinds of natural graphite, artificial graphite, carbon black, acetylene black, ketjen black, a carbon fiber, a metal powder or a metal fiber including copper, nickel, aluminum, silver, and so on, and a polyphenylene derivative.

In some embodiments, the negative electrode 112 may include a negative collector and a negative active material layer disposed on the negative current collector.

In some embodiments, the negative current collector may be a copper foil.

In some embodiments, the negative active material layer may include a negative active material, a binder, and optionally a conductive material.

In some embodiments, the negative active material may include a material that reversibly intercalates/deintercalates lithium ions, lithium metal, a lithium metal alloy, a material being capable of doping/dedoping lithium, transition metal oxide, or a combination thereof.

In some embodiments, the material that reversibly intercalates/deintercalates lithium ions may be a carbon material. In some embodiments, the carbon material may be any generally-used carbon-based negative active material in a lithium ion rechargeable battery. Examples of the carbon material include crystalline carbon, amorphous carbon, and mixtures thereof. In some embodiments, the crystalline carbon may be non-shaped, or sheet, flake, spherical, or fiber shaped natural graphite or artificial graphite. In some embodiments, the amorphous carbon may be a soft carbon, a hard carbon, a mesophase pitch carbonized product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping/dedoping lithium include a Si-based compound such as Si, $SiO_x$, (0<x<2), a Si—Y alloy (wherein Y is an alkali metal, an alkaline-earth metal, Group 13 to 16 elements, a transition element, a rare earth element, or a combination thereof, and not Si), a Si—C composite, or a combination thereof; a Sn-based compound such as Sn, $SnO_2$, a Sn—Y alloy (wherein Y is an alkali metal, an alkaline-earth metal, Group 13 to 16 elements, a transition element, a rare earth element, or a combination thereof, and not Sn), or a combination thereof; or a combination thereof. At least one of these materials may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

Examples of the transition metal oxide include vanadium oxide, lithium vanadium oxide, and the like.

In some embodiments, the binder may improve binding properties of negative active material particles with one another and with a current collector. Examples of the binder include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In some embodiments, the conductive material may be included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of metal powder or metal fiber including copper, nickel, aluminum, silver, and the like; a conductive polymer such as polyphenylene derivatives; or a mixture thereof.

In some embodiments, the negative and positive electrodes 112 and 114 may be fabricated in a method of mixing the active material, a conductive material, and a binder to prepare an active material composition and coating the composition on a current collector, respectively.

In some embodiments, the solvent may include N-methylpyrrolidone and the like, but is not limited thereto.

In some embodiments, the electrolyte may include a non-aqueous organic solvent and a lithium salt.

The non-aqueous organic solvent serves as a medium for transmitting ions taking part in the electrochemical reaction of a battery. In some embodiments, the non-aqueous organic solvent may be selected from a carbonate-based, ester-based, ether-based, ketone-based, alcohol-based, or aprotic solvent.

In some embodiments, the carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When the linear carbonate compounds and cyclic carbonate compounds are mixed, an organic solvent having high dielectric constant and low viscosity can be provided. In some embodiments, the cyclic carbonate and the linear carbonate may be mixed together in a volume ratio ranging from about 1:1 to about 1:9.

Examples of the ester-based solvent may include n-methylacetate, n-ethylacetate, n-propylacetate, dimethylacetate, methylpropionate, ethylpropionate, γ-butyrolactone, decanolide, valerolactone, mevalonolactone, caprolactone, or the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone, or the like. Examples of the alcohol-based solvent include ethyl alcohol, isopropyl alcohol, or the like.

In some embodiments, the non-aqueous organic solvent may be used singularly or in a mixture. When the organic solvent is used in a mixture, the mixture ratio can be controlled in accordance with a desirable battery performance.

In some embodiments, the non-aqueous electrolyte may further include an overcharge inhibitor additive such as ethylenecarbonate, pyrocarbonate, or the like.

In some embodiments, the lithium salt may be dissolved in an organic solvent, supplies lithium ions in a battery, and improves lithium ion transportation between positive and negative electrodes therein.

In some embodiments, the lithium salt may include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers of 1 to 20, respectively), LiCl, LiI, $LiB(C_2O_4)_2$ (lithium bis(oxalato) borate), or a combination thereof, as a supporting electrolytic salt.

In some embodiments, the lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

In some embodiments, the separator 113 may include any materials commonly used in the conventional lithium battery as long as separating a negative electrode 112 from a positive electrode 114 and providing a transporting passage for lithium ion. In some embodiments, the separator 113 may have a low resistance to ion transportation and an excellent impregnation site for an electrolyte. For example, the separator may be selected from glass fiber, polyester, polyethylene, polypropylene, polytetrafluoroethylene (PTFE), or a combination thereof. In some embodiments, the separator may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

The following examples illustrate the present embodiments in more detail. These examples, however, should not in any sense be interpreted as limiting the scope of the present embodiments.

Exemplary embodiments are described in more detail according to the Examples and Comparative Examples below. The following examples are for illustrative purposes only and are not intended to limit the scope of the one or more embodiments.

Preparation of Positive Active Material

Example 1

$FeC_2O_4$, $Li_2CO_3$, and $(NH_4)_2HPO_4$ were mixed in a mole ratio (based on moles of Fe, lithium, and phosphorus) of 1.07:1:1. The mixture was heat-treated at 700° C. under an atmosphere including 5% of $H_2$ and 95% of $N_2$, affording a lithium composite oxide in a ratio represented by $LiFe_{1.02}PO_4$.

Example 2

A lithium composite oxide in a ratio represented by $LiFe_{0.93}PO_4$ was prepared according to the same method as Example 1 except for mixing $F_eC_2O_4$, $Li_2CO_3$, and $(NH_4)_2HPO_4$ in a mole ratio (based on moles of Fe, lithium, and phosphorus) of 0.93:1:1.

Example 3

A lithium composite oxide in a ratio represented by $Li_{0.93}Fe_{0.93}PO_4$ was prepared according to the same method as Example 1 except for using $FeC_2O_4$, $Li_2CO_3$, and $(NH_4)_2HPO_4$ in a mole ratio (based on moles of Fe, lithium, and phosphorus) of 1:1:1.07.

Example 4

A lithium composite oxide in a ratio represented by $Li_{1.07}Fe_{1.07}PO_4$ was prepared according to the same method as Example 1 except for mixing $FeC_2O_4$, $Li_2CO_3$, and $(NH_4)_2HPO_4$ in a mole ratio (based on moles of Fe, lithium, and phosphorus) of 1:1:0.93.

Comparative Example 1

$FeC_2O_4$, $Li_2CO_3$, and $(NH_4)_2HPO_4$ were mixed in a mole ratio (based on moles of Fe, lithium, and phosphorus) of 1:1.05:1. The mixture was heat-treated at 600° C. under an atmosphere including 5% of $H_2$ and 95% of $N_2$, preparing a lithium composite oxide ($LiFePO_4$).

Evaluation 1: SEM Photograph Evaluation of Positive Active Material

FIGS. 2 to 6 are SEM photographs showing the positive active materials according to Examples 1 to 4 and Comparative Example 1.

Figure 6:
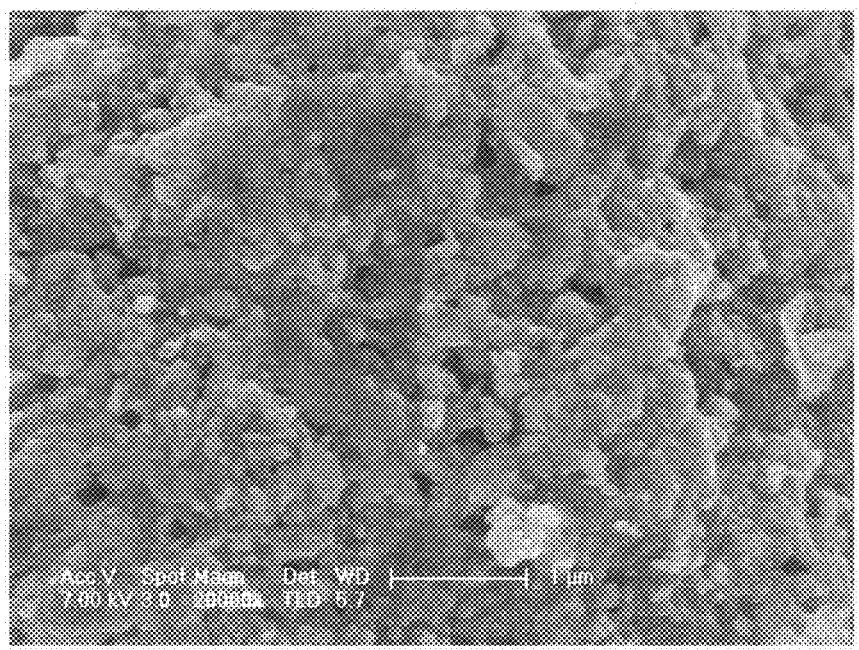
FIG. 6 is a SEM photograph showing a positive active material according to Comparative Example 1.

FIGS. 2 to 5 are respectively SEM photographs sequentially showing the positive active materials according to Examples 1 to 4, and FIG. 6 is a SEM photograph showing the positive active material according to Comparative Example 1.

Referring to FIGS. 2 to 6, the positive active material according to Example 2 had the smallest primary particle size.

Evaluation 2: Phase Evaluation of Positive Active Material

The positive active materials according to Examples 1 to 4 and Comparative Example 1 were measured regarding a mole ratio of a Fe-containing compound phase and a Li-containing compound phase and the amount of a $Fe^{2+}$-containing compound phase in ICP (inductively coupled plasma) and titration analysis methods. The results are provided in the following Table 1.

TABLE 1

|  | Amount of $Fe^{2+}$-containing compound phase (mol %)* | Mole ratio of Fe-containing compound phase/Li-containing compound phase |
|---|---|---|
| Example 1 | 65 | 0.99 |
| Example 2 | 86 | 0.92 |
| Example 3 | 70 | 1.00 |
| Example 4 | 71 | 1.00 |
| Comparative Example 1 | 54 | 1.05 |

The amount (mol %) of a $Fe^{2+}$-containing compound phase denotes a mol percentage of the $Fe^{2+}$-containing compound phase based on the entire amount of a Fe-containing compound phase (including the $Fe^{2+}$-containing compound phase and a $Fe^{3+}$-containing compound phase).

Referring to Table 1, the lithium composite oxides according to Examples 1 to 4 included the $Fe^{2+}$-containing compound phase in an amount of 58 to 100 mol % based on the total amount of the Fe-containing compound phase.

In addition, the lithium composite oxides according to Examples 1 to 4 included the Fe-containing compound phase relative to the Li-containing compound phase in a mole ratio of 0.80 to 1.00.

Evaluation 3: Conductivity Evaluation of Positive Active Material

The positive active materials according to Examples 1 to 4 and Comparative Example 1 were measured regarding conductivity. The results are provided in the following Table 2.

The positive active material powders were pelletized, pressed by respectively applying power of 4, 8, 12, 16, and 20 kN, and measure regarding electric conductivity.

TABLE 2

| | Electrical conductivity (S/m) | | | | |
|---|---|---|---|---|---|
| | 4 kN | 8 kN | 12 kN | 16 kN | 20 kN |
| Example 1 | 1.39E−04 | 1.96E−04 | 2.32E−04 | 2.58E−04 | 2.79E−04 |
| Example 2 | 7.5E−04 | 1.05E−03 | 1.24E−03 | 1.38E−03 | 1.49E−03 |
| Example 3 | 2.11E−04 | 2.45E−04 | 2.70E−04 | 2.96E−04 | 3.21E−04 |
| Example 4 | 6.59E−04 | 7.10E−04 | 8.31E−04 | 1.02E−03 | 1.29E−03 |

TABLE 2-continued

| | Electrical conductivity (S/m) | | | | |
|---|---|---|---|---|---|
| | 4 kN | 8 kN | 12 kN | 16 kN | 20 kN |
| Comparative Example 1 | 1.20E−04 | 1.25E−04 | 1.89E−04 | 2.39E−04 | 2.52E−04 |

Based on Table 2, the lithium composite oxides of Examples 1 to 4 had excellent conductivity compared with that of Comparative Example 1.

Fabrication of Rechargeable Lithium Battery Cell 96 wt % of each positive active material according to Examples 1 to 4 and Comparative Example 1, 2 wt % of polyvinylidene fluoride (PVDF), and 2 wt % of acetylene black were mixed, and the mixtures were dispersed in N-methyl-2-pyrrolidone, preparing slurries. The slurries were respectively coated on a 60 μm-thick aluminum foil to form positive active material layers and then, dried at 135° C. for greater than or equal to 3 hours and compressed, fabricating positive electrodes.

The positive electrodes and metal lithium as a counter electrode were used to fabricate coin-type half-cells. Herein, an electrolyte solution was prepared by mixing ethylenecarbonate (EC) and dimethylcarbonate (DMC) in a volume ratio of 3:7 and dissolving $LiPF_6$ therein in a concentration of 1.3M.

Evaluation 4: Charge and Discharge Characteristics of Rechargeable Lithium Battery Cell Rechargeable lithium battery cells fabricated respectively using positive active materials according to Examples 1 to 4 and Comparative Example 1 were measured regarding charge and discharge characteristics. The results are provided in the following Table 3.

The rechargeable lithium battery cells were charged at 0.1 C under a CC/CV mode and discharged at 0.1 C under a CC mode at 2 V to 3.8 V, completing the first cycle.

The rechargeable lithium battery cells were charged at 0.2 C under a CC/CV mode and discharged at 0.2 C under a CC mode at 2 to 3.8V, completing the 1 cycle.

The rechargeable lithium battery cells were charged at 0.5 C under a CC/CV mode and discharged at 0.5 C under a CC mode, completing the 1 cycle at 2 V to 3.8 V.

The rechargeable lithium battery cells were charged with charged at 1 C under a CC/CV mode and discharged at 1 C under a CC mode, completing the first cycle at 2 V to 3.8 V.

The rechargeable lithium battery cells were charged at 1 C under a CC/CV mode and discharged at 3.0 C under a CC mode, completing the first cycle at 2 V to 3.8 V.

The rechargeable lithium battery cells were charged at 1 C under a CC/CV mode and discharged at 5.0 C under a CC mode, completing the first cycle at 2 V to 3.8 V.

The following capacity retention (%) is a percentage of discharge capacity at 1 C relative to discharge capacity at 0.1 C and a percentage of discharge capacity at 5 C relative to discharge capacity at 0.1 C, respectively.

TABLE 3

| | Discharge capacity (mAh/g) | | | | | | Capacity retention (%)* | |
|---|---|---|---|---|---|---|---|---|
| | 0.1 C | 0.2 C | 0.5 C | 1 C | 3 C | 5 C | 1 C/0.1 C | 5 C/0.1 C |
| Example 1 | 156.57 | 147.49 | 142.29 | 139.57 | 131.99 | 127.89 | 89.14 | 81.68 |
| Example 2 | 160.29 | 152.34 | 144.44 | 142.69 | 137.3 | 133.64 | 89.02 | 83.37 |
| Example 3 | 158.54 | 151.9 | 142.66 | 138.72 | 132.65 | 126.89 | 87.49 | 80.03 |
| Example 4 | 159.03 | 148.98 | 143.79 | 138.61 | 132.64 | 127.69 | 88.83 | 80.29 |
| Comparative Example 1 | 156.04 | 147.99 | 141.77 | 137.07 | 131.24 | 124.81 | 87.84 | 79.98 |

Based on Table 3, the rechargeable lithium battery cells using the lithium composite oxides according to Examples 1 to 4 had high-capacity and excellent high-rate charge and discharge characteristics compared with the rechargeable lithium battery cell using the lithium composite oxide according to Comparative Example 1.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive active material for a rechargeable lithium battery, comprising:
    a lithium composite oxide comprising Li (lithium), Fe (iron), P (phosphorus) and O (oxygen) in a ratio represented by the following Chemical Formula 1, $Li_xFe_yPO_4$     Chemical Formula 1 wherein, $0.8 \leq x \leq 1.2$, and $0.9 \leq y \leq 1.1$ provided both x and y are not 1; and
    the positive active material is prepared by a method comprising:
    mixing a Fe-containing compound, a lithium salt, and a phosphate salt (based on moles of Fe, lithium, and phosphorus) at about 0.8 to 1.2:about 0.9 to 1.1:about 0.8 to 1.2 to obtain a mixture provided that the ratio of Fe, lithium, and phosphorus is not 1:1:1 or 1:1.05:1; and
    heat-treating the mixture at 650° C. to 850° C. under a reduction atmosphere.

2. The positive active material for a rechargeable lithium battery of claim 1, wherein the lithium composite oxide includes a Fe-containing compound phase and a Li-containing compound phase, and a mole ratio of the Fe-containing compound phase to the Li-containing compound phase (based on moles of Fe and Li) ranges from about 0.80 to about 1.00.

3. The positive active material for a rechargeable lithium battery of claim 2, wherein the Fe-containing compound phase comprises a $Fe^{2+}$-containing compound phase, a $Fe^{3+}$-containing compound phase, or a combination thereof.

4. A positive electrode for a rechargeable lithium battery, comprising the positive active material of claim 1; and a current collector.

5. A rechargeable lithium battery, comprising:
    a positive electrode including the positive active material according to claim 1;
    a negative electrode; and
    an electrolyte.

6. The positive active material for a rechargeable lithium battery of claim 1, wherein the Fe-containing compound comprises at least one component selected from the group consisting of $FeSO_4$, $FeCO_3$, $FeO$, $FeC_2O_4$, $FePO_4$, and $Fe_3(PO_4)_2$.

7. The positive active material for a rechargeable lithium battery of claim 1, wherein the lithium salt comprises at least one component selected from the group consisting of $Li_2CO_3$, $Li_3PO_4$, and LiCl.

8. The positive active material for a rechargeable lithium battery of claim 1, wherein the phosphate salt comprises at least one component selected from the group consisting of $Li_3PO_4$, $(NH_4)_2HPO_4$, $NH_4H_2PO_4$, and $H_3PO_4$.

9. The positive active material for a rechargeable lithium battery of claim 1, wherein the Fe-containing compound, the lithium salt and the phosphate salt may be mixed in a mole ratio (based on moles of Fe, lithium, and phosphorus) of about 0.8 to 1.05:1.0 to 1.1:0.9 to 1.1.

10. The positive active material for a rechargeable lithium battery of claim 1, wherein the reduction atmosphere comprises a $H_2$ atmosphere.

* * * * *